United States Patent [19]

Williams et al.

[11] 4,160,816
[45] Jul. 10, 1979

[54] PROCESS FOR STORING SOLAR ENERGY IN THE FORM OF AN ELECTROCHEMICALLY GENERATED COMPOUND

[75] Inventors: Richard Williams, Princeton; Allen Bloom, East Windsor, both of N.J.

[73] Assignee: RCA Corporation, New York, N.Y.

[21] Appl. No.: 857,758

[22] Filed: Dec. 5, 1977

[51] Int. Cl.² ............................. C01B 1/13; C25B 3/04
[52] U.S. Cl. ................................ 423/648 R; 204/72; 204/76
[58] Field of Search .................... 204/72, 73 R, 76; 423/648, 648 R

[56] References Cited

U.S. PATENT DOCUMENTS

| | | | |
|---|---|---|---|
| 1,185,028 | 5/1916 | Vaygouny | 204/76 |
| 3,959,094 | 5/1976 | Steinberg | 204/77 |
| 4,021,323 | 5/1977 | Kilby et al. | 204/129 |
| 4,067,958 | 1/1978 | Gorin | 423/657 |

OTHER PUBLICATIONS

Russell et al., J. Electrochem. Soc., vol. 124, pp. 1329–1337, Sep. 1977.
J. Physical Chem., vol. 76, No. 22, pp. 3278–3286, 1972, by Ryu et al.

*Primary Examiner*—F. C. Edmundson
*Attorney, Agent, or Firm*—Birgit E. Morris; A. Stephen Zavell

[57] ABSTRACT

A process for storing energy from solar radiation whereby solar radiation is converted into electrical current which is supplied to an electrochemical cell in combination with water and carbon dioxide gas to produce formic acid as an electrochemical storage medium. The formic acid can be easily decomposed by catalysts known in the art into carbon dioxide and hydrogen gas which can be burned as fuel or used as a starting material in numerous commercial applications.

6 Claims, 2 Drawing Figures

PROCESS FOR STORING SOLAR ENERGY IN THE FORM OF AN ELECTROCHEMICALLY GENERATED COMPOUND

This invention relates to storage and retrieval of energy derived from solar radiation in the form of an electrochemically generated material.

BACKGROUND OF THE INVENTION

Weather and seasonal variations greatly affect the amount of solar radiation available to generate power. Experts in solar energy have long realized that the greatest drawback in the use of solar generated electricity or fuels is that energy consumption is not limited to times when direct solar energy is available. The mismatch between the time of production and time of use implies a need for large scale storage of solar generated energy. Today, there is a great need for a process of storing solar generated energy in a readily available form.

Electrolysis of water, using the electrical energy from photovoltaic cells which can convert solar energy to electrical current, can provide a potentially limitless source of hydrogen fuel. However, the single greatest drawback to hydrogen generated by electrolysis or photoelectrolysis has involved the storage of the hydrogen. The energy contained per unit volume for gaseous hydrogen is very low. A volume of about 312.5 liters (L) is necessary to store 1 kilowatt (kWh) of hydrogen at atmospheric pressure and standard temperature, i.e., about 25° C. Clearly, tremendous storage volumes would be necessary for the large amounts of energy industry will require if there is a major conversion to the use of hydrogen gas as a fuel.

In its liquid form, hydrogen is a more compact source of energy. Sufficient liquid hydrogen to generate 1 kWh of electricity requires a volume of only about 0.36 L. However, the cost of cryogenic equipment necessary to maintain the hydrogen in a liquid state at 20° K. or below, is prohibitively expensive.

Metal hydrides, such as $MgH_2$, $LiH$, or $CaH_2$, are potential storage media. However, metal hydride storage would require the use of valuable metals which are not inexhaustable and which require large amounts of energy to mine and refine. Releasing energy stored in metal hydrides requires a further large input of energy because of the high equilibrium temperatures of the materials.

Methanol has been suggested as a combustible chemical compound but has been rejected, among other reasons, for its difficulty in conversion to electricity directly in fuel cells and its adverse environmental effects on burning.

Thus, a search has continued for a chemical compound that can store and release the electrical current obtained from solar energy in an efficient and environmentally satisfactory manner.

SUMMARY OF THE INVENTION

We have invented a process for storing energy from solar radiation in the form of an electrochemically generated compound which can be subsequently decomposed to provide hydrogen gas. Solar radiation is converted into electric current which is used to generate formic acid electrochemically. The formic acid generated can either be burned as a fuel directly or subjected to catalytic decomposition to produce hydrogen fuel and carbon dioxide.

DETAILED DESCRIPTION OF THE INVENTION

Figure 1:
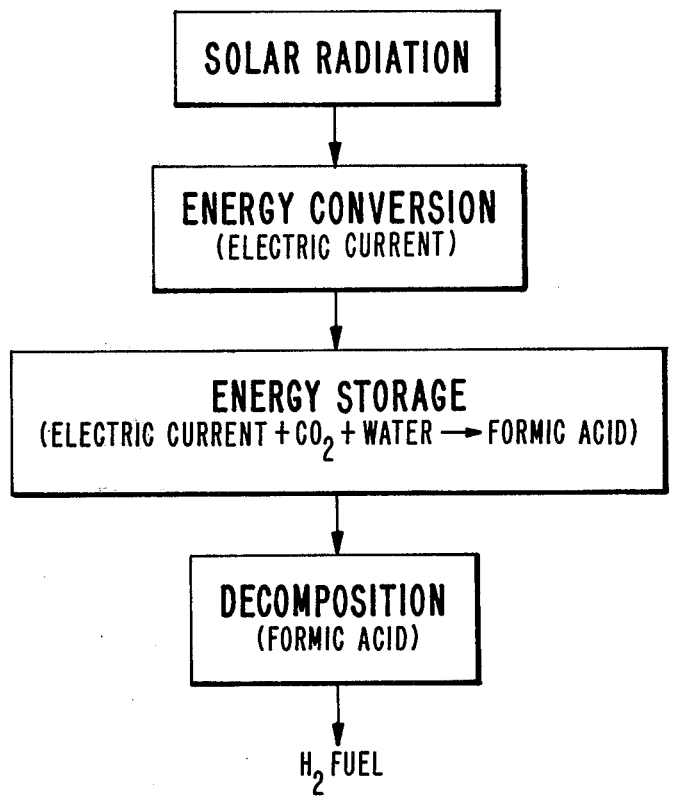
FIG. 1 depicts a flow diagram of the process according to our invention.

The overall system of our invention is illustrated by FIG. 1. Solar radiation is converted into electric current which is in turn combined with carbon dioxide and water to form formic acid in an electrochemical cell. The energy stored in the form of formic acid is decomposed to produce hydrogen gas which can be used as a fuel, and carbon dioxide, which may be reused in the energy storage cycle.

As an energy storage medium, formic acid is superior to hydrogen. A given quantity of hydrogen gas at one atmosphere and standard temperature, occupies 580 times more volume than the corresponding amount of formic acid needed to give the same quantity of hydrogen upon decomposition. The equivalent amount of formic acid to store 1 kWh of energy occupies a volume of only 0.5 L. The cost of storing and transporting formic acid is substantially less than the cost of storage and transportation of hydrogen in either its liquid or gaseous form. Furthermore, formic acid does not require the fire hazard precautions that must be taken with hydrogen gas.

The prior art teaches reactions for the electrochemical formation of formic acid or formate ion in both basic and acidic solutions.

In basic solution, the overall reaction proceeds as follows:

$$CO_2 + H_2O \xrightarrow{(2e^-)} HCO_2^- + OH^- \qquad (1)$$

The formate ion $HCO_2^-$ can be converted into formic acid by rendering the basic solution acidic.

In acidic solution, the overall reaction proceeds as follows:

$$CO_2 + 2H^+ \xrightarrow{(2e^-)} HCOOH \qquad (2)$$

Although different mechanisms for the electrochemical reactions have been hypothesized by various workers, the overall import of the work performed with respect to reduction of carbon dioxide to formic acid in solution is that at neutral or basic pH, the formic acid remains in solution as the formate ion.

Hereafter, the term formic acid or formic acid solution is defined to cover solutions where both formic acid and formate ions are present. The exact ratio of acid or ion form in solution depends upon the pH. At a pH above the equilibrium, i.e., about pH 3.75, the ion form is in higher concentrations than the acid form. Below the equilibrium pH, formic acid is in higher concentrations than formate ions.

The current from a solar energy device is used to generate formic acid as an energy storage medium at the cathode of an electrochemical reaction cell. The solar energy device can be any device known in the art which can convert solar radiation into sufficient current and voltage to drive the electrochemical reaction towards the production of formic acid, i.e., solar cells, photothermal converters, wind power, etc. An example of an effective photovaltaic device is illustrated in U.S. Pat. No. 4,028,720 to Pankove. Additional devices are described and illustrated in *FROM PHOTONS TO KILOWATTS: Can Solar Technology Deliver?* by Joel Debow, Electronics, Nov. 11, 1976.

The solar energy devices, which convert solar radiation into electrical current, are connected to an anode and a cathode immersed in water and an electrolyte in an electrochemical cell. Carbon dioxide gas is diffused over the cathode. A minimum voltage of about 1.50 volts at the cathode is required for the reduction of the carbon dioxide to formic acid at the interface of the carbon dioxide-cathode-electrolyte solution interface.

Since the reaction of interest takes place at the cathode, the anode of the cell may be of any suitable material which is inert with respect to the electrolyte for example, graphite, titanium dioxide, etc.

The cathode should be of a material with a high hydrogen overvoltage to increase the production of formic acid, and inhibit the formation of hydrogen gas. The cathode material should have a hydrogen overvoltage of at least about 0.5 volt and preferably about 0.9 volt or greater. Lead, cadmium, copper amalgam, or mercury are suitable electrode materials. Platinum would be a poor electrode choice because its low hydrogen overvoltage would tend to favor the production of hydrogen over the formation of formic acid (formate ion). *THE OXIDATION STATES OF ELEMENTS AND THEIR POTENTIAL IN AQUEOUS SOLUTIONS*, by W. N. Latimer, Prentice Hall, Inc., p. 33.

The pH of the solution is adjusted to increase or favor the production of formic acid and inhibit the formation of hydrogen. The most favorable conditions for formic acid production occur in neutral pH solution, preferably buffered in the range of about pH 6 to about pH 9 and most preferably about pH 7 to about pH 8. The efficiency of the formation of formic acid tends to decrease with increasing acidity of the solution because of the competition at the cathode for the production of hydrogen. Any buffer, such as sodium bicarbonate, operative within these ranges is within the scope of the invention.

Temperature is not critical although the reaction proceeds faster at higher temperatures. Generally, the temperature may vary from about 5° C. to about 100° C. and preferably 20° C. to 50° C.

The ultimate strength of the formic acid solution produced from the electrochemical reaction cell depends on the buffering system, temperature, rate of flow of carbon dioxide and the choice of electrodes.

Water photolysis apparatuses known in the art such as those described in U.S. Pat. Nos. 3,925,212; 4,011,139; and 4,021,323 can be modified to favor the generation of formic acid over the generation of hydrogen. The desired conversion requires the selection of the proper pH, i.e., approximately neutral, and the selection of a cathode material with a high hydrogen overvoltage. A further modification of conventional electrolysis cells requires the provision for a diffusor to bubble $CO_2$ over the cathode during the reaction.

The formic acid produced according to our process can be stored as an aqueous solution or converted into concentrated formic acid by conventional methods known in the art, i.e., evaporation.

When the stored energy is needed, the formic acid solution can be converted to carbon dioxide and hydrogen gas. Although not critical, a pH below about pH 7 is preferred for the dissociation of formic acid. The reaction is known and occurs according to the following dehydrogenation reaction:

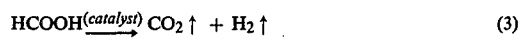

The formic acid solution can be passed over catalysts known in the art to dehydrogenate the formic acid into hydrogen and carbon dioxide. The carbon dioxide can be readily separated from the hydrogen by known methods and re-used in the electrochemical reaction.

Due to the nature of the decomposition, little or no energy is required to activate it. The decomposition reaction can be initiated spontaneously in the presence of an appropriate catalyst such as about 1% to about 10% or greater of palladium by weight on activated carbon. The decomposition reaction will occur in solutions as dilute as about 20:1 water to formic acid.

Figure 2:
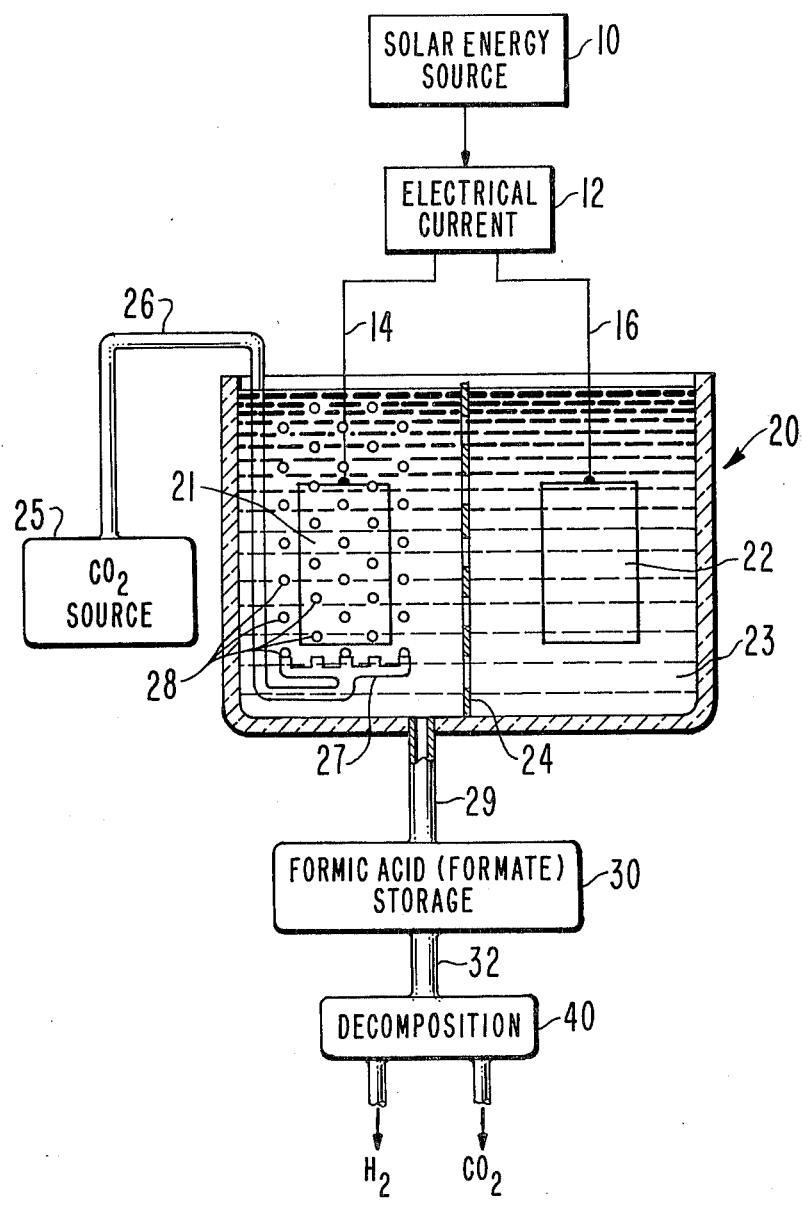
FIG. 2 is a schematic and cross-sectional view of an embodiment of our invention.

FIG. 2 illustrates a schematic and flow diagram of our present process. Solar energy 10 is converted into electrical current 12. The electrical current 12 flows through wire 16 to an anode 22 immersed in the electrolyte 23 contained in the electrochemical cell 20. Electrons flow through wire 14 to a cathode 21, also immersed in the electrolyte 23, and into solution at the cathode electrolyte interface. An ion permeable membrane 24 separates cathode 21 and anode 22 and further prevents the migration of anions (formate ions) to the anode 22 while allowing the migration of cations towards cathode 21. Alternative designs for the electrolysis cell, known in the art, could dispense with the requirement of the ion permeable membrane.

A $CO_2$ source 25 provides $CO_2$ to the electrolyte solution 23 by pipe 26 and diffusor 27. Electrons supplied by the electrical current source 12 combine with hydrogen ions and $CO_2$ gas bubbled over the cathode 21 to produce formic acid at the electrolyte-cathode-$CO_2$ gas interface in accordance with the overall reaction of equations (1 or 2). The formic acid produced in the electrochemical reaction cell 20 is drawn off through conduit 29 and placed in a suitable storage container 30.

The generated formic acid solution stored in container 30 can be transported by pipeline 32 to a situs 40 for decomposition into hydrogen fuel and carbon dioxide. If the situs 40 is sufficiently close to the electrochemical cell 20, the carbon dioxide can be re-used to form additional formic acid.

Our invention resides not in the exact reaction by which the formic acid is formed but rather the overall method or processes of storing solar energy in the form of formic acid which can be decomposed as needed to reclaim the stored solar energy in the form of hydrogen gas.

The invention will be further illustrated by the following examples but it is to be understood that the invention is not meant to be limited to the details disclosed therein.

EXAMPLE I

Part A

A platinum anode and an amalgamated copper cathode were immersed in a self-buffered sodium bicarbonate-$CO_2$ aqueous solution wherein the pH was adjusted to about pH 8 by the addition of 0.2 moles per liter of sodium bicarbonate and a $CO_2$ flow rate of 0.1 cubic feet per hour.

A potential of four volts and a current of 0.2 amperes was applied through the electrodes to the solution for 260 minutes. The initial and final cell temperatures were 25° C.

The final concentration of formic acid was 0.55 gram as determined by titration with potassium permanganate. This corresponds to a conversion efficiency of about 75% with respect to the possible theoretically calculated yield.

Part B

The formic acid solution generated from Part A is exposed to a 1% palladium on activated carbon catalyst (Alfa Products #89113) in a concentration of about 1 part of formic acid to about 10 parts of water at a pH of 4 and a temperature of about 25° C. The solution copiously evolved hydrogen gas and carbon dioxide without the need for any directly applied outside energy source such as heat.

EXAMPLE II

The same voltage and current of Example I was passed to an electrolyte cell having a cadmium cathode immersed in an electrolyte solution similar to Example I for about 240 minutes. The reaction produced a 0.33 gram of formic acid (formate ion) which corresponds to a reaction yield of about 48%.

EXAMPLE III

An electrical current of 0.2 amperes was passed through an amalgamated copper cathode immersed in a self-buffered $CO_2$-$NaHCO_3$ aqueous solution similar to Examples I and II. The cathode potential was about 2.2 volts relative to a saturated calomel electrode (SCE). After two hours, the reaction yield was about 100%, i.e., equivalent to the theoretically calculated yield.

We claim:

1. A process for storing solar energy in the form of an electrochemically generated material and retrieving the stored energy as hydrogen fuel comprising:
    (a) converting solar radiation directly into electric current;
    (b) applying said electric current to an anode and a cathode immersed in an electrolyte solution, wherein the voltage at said cathode is at least about 1.50 volts, said cathode comprising a material with a hydrogen overvoltage greater than about 0.5 volt to inhibit the production of hydrogen gas and increases the production of formic acid and the pH of said electrolyte solution is adjusted to from about pH 6 to about pH 9 to inhibit the formation of hydrogen and increase the formation of formic acid;
    (c) diffusing $CO_2$ gas over said cathode to form formic acid;
    (d) storing said formic acid; and
    (e) retrieving said stored solar energy from said formic acid as $H_2$ fuel.

2. The process according to claim 1 wherein the stored solar energy is retrieved by catalytically decomposing the formic acid into carbon dioxide gas and $H_2$ fuel.

3. The process according to claim 2 wherein said formic acid is decomposed in the presence of about a 1% to about a 10% palladium on activated carbon catalyst.

4. The process according to claim 3 wherein the concentration of said formic acid to water ratio is greater than about 1:20.

5. The process according to claim 1 wherein the pH is from about 7 to 9.

6. The process according to claim 1 wherein the hydrogen overvoltage of said cathode is greater than about 0.9 volt.

* * * * *